United States Patent
Liu et al.

(10) Patent No.: US 10,776,947 B2
(45) Date of Patent: Sep. 15, 2020

(54) METHOD, SYSTEM AND EQUIPMENT FOR AUTOMATICALLY DETECTING AND TRACKING BLADE

(71) Applicant: Shanghai Clobotics Technology Co., Ltd., Shanghai (CN)

(72) Inventors: Xun Liu, Shanghai (CN); Limin Shang, Shanghai (CN); Xiaoming Chen, Shanghai (CN); Hua Ye, Shanghai (CN); Yan Ke, Shanghai (CN)

( * ) Notice: Subject to any disclaimer, the term of this patent is extended or adjusted under 35 U.S.C. 154(b) by 167 days.

(21) Appl. No.: 16/112,779

(22) Filed: Aug. 27, 2018

(65) Prior Publication Data

US 2019/0370999 A1    Dec. 5, 2019

(30) Foreign Application Priority Data

May 31, 2018    (CN) .......................... 2018 1 0547475

(51) Int. Cl.
  *G06T 7/00*    (2017.01)
  *G06T 7/73*    (2017.01)
  *G06T 7/13*    (2017.01)

(52) U.S. Cl.
  CPC .   *G06T 7/74* (2017.01); *G06T 7/13* (2017.01)

(58) Field of Classification Search
  None
  See application file for complete search history.

(56) References Cited

U.S. PATENT DOCUMENTS

| 2009/0317002 A1 | 12/2009 | Dein |
| 2018/0003161 A1* | 1/2018 | Michini ................. F03D 17/00 |
| 2018/0149138 A1* | 5/2018 | Thiercelin .............. B64D 47/08 |
| 2018/0259955 A1* | 9/2018 | Noto .................... G05D 1/0011 |

FOREIGN PATENT DOCUMENTS

| CN | 103149939 A | 6/2013 |
| CN | 104730091 A | 6/2015 |
| CN | 105844268 A | 8/2016 |
| CN | 206804553 U | 12/2017 |
| CN | 107862704 A | 3/2018 |
| CN | 108038417 A | 5/2018 |
| EP | 3306262 A1 | 4/2018 |

* cited by examiner

*Primary Examiner* — Fayyaz Alam
(74) *Attorney, Agent, or Firm* — Andrew C. Cheng

(57) ABSTRACT

The present invention provides a method, a system and an equipment for automatically detecting and tracking a blade, used for tracking the blade of the wind power generator through an unmanned aerial vehicle. The unmanned aerial vehicle is provided with a cradle head, the cradle head controls a shooting angle of a camera, including the following steps: acquiring a blade video file through a camera, detecting at least one frame of the blade image in the blade video file, and extracting side edges of the blade region in the at least one frame of blade images; tracking and detecting the side edges of the blade region in temporally adjacent multi-frame blade images in the blade video file according to the side edges of the blade region; determining a center point of the blade region in each frame of the blade image; and adjusting the cradle head.

20 Claims, 8 Drawing Sheets

METHOD, SYSTEM AND EQUIPMENT FOR AUTOMATICALLY DETECTING AND TRACKING BLADE

CROSS REFERENCE TO RELATED APPLICATIONS

This application is based upon and claims priority to Chinese Patent Application No. 201810547475.0, filed on May 31, 2018, the entire content of which is incorporated herein by reference.

TECHNICAL FIELD

The present invention relates to detection of a blade of a wind power generator, in particular to a method, a system and an equipment for automatically detecting and tracking a blade.

BACKGROUND

A wind power generator is an electrical device that converts wind energy into mechanical energy and drives a rotor to rotate by the mechanical energy to output alternating current. A wind power generator is generally formed by components such as a blade, a power generator, a direction adjuster, a tower, a speed-limiting safety mechanism and an energy storage device, etc.

During the long-term operation of the wind power generator, the surface of the blade is subjected to various damages, such as blade protective film damage, blade paint dropping, blade icing, blade crack and blade oil stain, etc.

Currently, when carrying out a damage detection on the surface of the blade, a worker usually needs to climb up to the wind power generator to perform detection, which not only consumes a large amount of manpower, but also requires the worker to perform operation at high-altitude, bringing certain risks to the safety of the worker.

Therefore, a camera mounted on an unmanned aerial vehicle can be used to inspect the wind power generator instead of manual inspection. However, in camera mounted unmanned aerial vehicle, GPS is used for positioning, but there can be errors in GPS positioning and modeling the flight path of the unmanned aerial vehicle, so it cannot be ensured that the blade of the wind power generator is always in the center of the image capturing screen of the camera, and even the blade may deviate from the image capturing screen. Therefore, a method that tracks and photographs the blade all the time is needed.

SUMMARY

In view of the defects in the prior art, the objective of the present invention is to provide a method, a system and an equipment for automatically detecting and tracking a blade.

The method for automatically detecting and tracking the blade provided by the present invention is used for tracking the blade of the wind power generator through an unmanned aerial vehicle. The unmanned aerial vehicle is provided with a cradle head, the cradle head controls a shooting angle of the camera, including the following steps:

S1: acquiring a blade video file through the camera, detecting at least one frame of the blade image in the blade video file, and extracting side edges of a blade region in the at least one frame of the blade image;

S2: tracking and detecting the side edges of the blade region in temporally adjacent multi-frame blade images in the blade video file according to the side edges of the blade region;

S3: determining a midpoint of a connecting line between midpoints of the side edges of the blade in the multi-frame blade image as the center point of the blade region in each frame of the blade image, and adjusting the cradle head according to the offset between the center point of the blade region and a center of the corresponding frame of the blade image so that the center point of the blade region moves toward the center of the corresponding frame of the blade image.

Preferably, S1 includes:

S101: performing a line detection on a frame of the blade image, and extracting a plurality of first lines extending along the length direction of the blade on the frame of the blade image;

S102: merging a plurality of adjacent first lines and first lines with the same slope and on the same straight line respectively to generate a plurality of second lines;

S103: according to a target point located on the blade region, selecting second lines which are located on both sides of the target point, and have the parallelism less than a preset parallelism threshold and the length greater than two thirds of the length of the diagonal of the at least one frame of the blade image as the side edges of the blade region, and the parallelism is inversely proportional to the included angle between the two second lines.

More preferably, after the S103, the following steps are further included:

Step M101: repeatedly performing steps S101 to S103 to extract the side edges of the blade region on the multi-frame blade image;

Step M102: determining a similarity value of the side edges in two frames of the blade image according to the angles and distances between the side edges in the two frames of the blade image, wherein the distances between the side edges of the two frames of the blade image are the vertical distances between the side edges of one frame of the blade image and the side edges of the other frame of the blade image when the side edges of the one frame of the blade image are turned to be parallel to the side edges of the other frame of the blade image;

Step M103: in the multi-frame blade image, when the similarity values of the side edges of optional two frames of the blade image in majority frames of the blade image are both less than a preset similarity threshold, selecting a pair of side edges from the side edges of the majority frames of the blade image as the side edges of the blade region.

Preferably, S2 includes:

S201: performing the line detection on another temporally adjacent frame of the blade image, and extracting a plurality of third lines extending along the length direction of the blade on the another frame of the blade image;

S202: merging a plurality of adjacent third lines and third lines with the same slope and on the same straight line respectively to generate a plurality of fourth lines;

S203: according to the center point, selecting a plurality of fourth lines which are located on both sides of the center point, and have the parallelism less than a preset parallelism threshold and the length greater than two thirds of the length of the diagonal of the another frame of the blade image from the plurality of fourth lines as first initial side edges of the blade region.

More preferably, the method includes the following steps after the S203:

N101: according to the angles and distances between the side edges of the blade region and the plurality of fourth lines, determining similarity values between the plurality of fourth lines and the side edges of the blade region, wherein the distances between the side edges of the blade region and each of the plurality of fourth lines are the vertical distances between the fourth lines and the side edges of the blade region after the fourth lines are turned to be parallel to the side edges;

N102: selecting a pair of fourth lines from the plurality of fourth lines according to a preset similarity threshold as the second initial side edges of the blade region in another frame of the blade image;

N103: estimating third initial side edges of the blade region in the another temporally adjacent frame of the blade image according to the side edge displacement of the blade region in at least two frames of the blade image which are temporally adjacent and before another frame of the blade image;

N104: when the similarity values between at least two initial side edges of the first initial side edges, the second initial side edges and the third initial side edges are all less than the preset similarity threshold, selecting a pair of target side edges from the two initial side edges with similarity values less than the preset similarity threshold as the side edges of the another frame of the blade image;

N105: repeatedly performing S201 to N104 to sequentially detect the blade side edges of the temporally adjacent frames of the blade image.

Preferably, the center of the blade image is a center region centered on the center point of the blade image. When the center point of the blade region is located in the center region, the offset is deemed to be zero.

Preferably, the similarity value is specifically as follows. When the side edges of the blade region in a frame of the blade image are represented as $l_1$, $l_2$, and the side edges of the blade region in another frame of the blade image are represented as $l_3$, $l_4$, the similarity value between $l_1$ and $l_3$ is $V(l_1, l_3)$, generated based on the included angle between $l_1$ and $l_3$ and by performing normalization after turning $l_1$ to be parallel to $l_3$, similarity value between the side edges of the blade region in the frame of the blade image and the side edges of the blade region in another frame of the blade image is $V_{total}$. $V_{total} = \min[V(l_1, l_3), V(l_1, l_4)] + \min[V(l_2, l_3), V(l_2, l_4)]$, wherein $V(l_1, l_4)$ is similarity value between $l_1$ and $l_4$, $V(l_2, l_3)$ is similarity value between $l_2$ and $l_3$, and $V(l_2, l_4)$ is similarity value between $l_2$ and $l_4$.

The system for automatically detecting and tracking the blade, provided by the present invention is used for realizing the method for automatically detecting and tracking blade, includes:

a side edge detection module, configured to detect at least one frame of the blade image in the blade video file and extract the side edges of the blade region in the at least one frame of the blade image;

a tracking detection module, configured to track and detect the side edges of the blade region in the temporally adjacent multi-frame blade images in the blade video file according to the side edges of the blade region;

a cradle head control module, configured to determine a midpoint of a connecting line between midpoints of the side edges of the blade in the multi-frame blade image as the center point of the blade region in each frame of the blade image, and adjust the cradle head according to the offset between the center point of the blade region and a center of the corresponding frame of the blade image so that the center point of the blade region moves toward the center of the corresponding frame of the blade image.

The equipment for automatically detecting and tracking the blade provided by the present invention includes:

a processor and a memory storing executable instructions of the processor. The processor is configured to execute the method for automatically detecting and tracking the blade by executing the executable instructions.

Compared with the prior art, the advantages of the present invention are as follows.

According to the present invention, the center point of the blade region is calculated by detecting the side edges of the blade in the blade image, and then the cradle head is adjusted according to the offset between the center point of the blade region and the center of the blade image, realizing the adjustment of the camera shooting angle, so that the center point of the blade region moves toward the center of the corresponding frame blade image in the subsequent frame blade image, making the blade region as close to the center of the blade image as possible, and improving the image quality.

BRIEF DESCRIPTION OF THE DRAWINGS

With reference to the detailed description of non-limiting embodiments by the following drawings, other features, objectives and advantages of the present invention will become more apparent.

DETAILED DESCRIPTION

The present invention will now be described in detail with reference to embodiments. The following embodiments will help those skilled in the art to further understand the present invention, but do not limit the present invention in any way. It should be noted that for those of ordinary skill in the art, several modifications and improvements can be made without departing from the concept of the present invention. These modifications and improvements are all considered as falling within the scope of the present invention.

Figure 1:
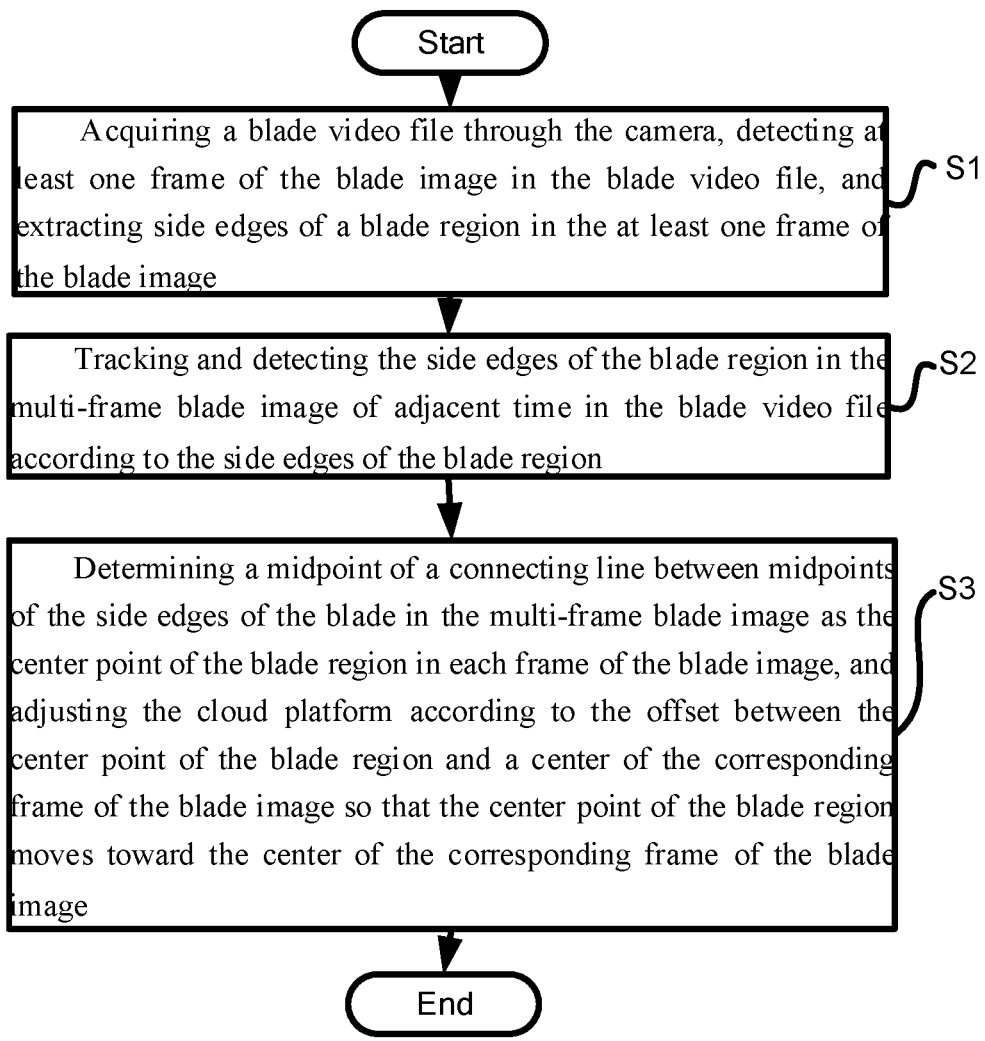
FIG. 1 is a flowchart showing the method for automatically detecting and tracking the blade according to an embodiment of the present invention.

FIG. 1 is a flowchart showing the method for automatically detecting and tracking the blade according to an embodiment of the present invention. As shown in FIG. 1, the method for automatically detecting and tracking the blade is used for tracking the blade of the wind power generator through an unmanned aerial vehicle. The unmanned aerial vehicle is provided with a cradle head, the cradle head controls a shooting angle of the camera, including the following steps:

S1: acquiring a blade video file through the camera, detecting at least one frame of the blade image in the blade video file, and extracting side edges of a blade region in the at least one frame of the blade image;

S2: tracking and detecting the side edges of the blade region in the multi-frame blade image of adjacent time in the blade video file according to the side edges of the blade region;

S3: determining a midpoint of a connecting line between midpoints of the side edges of the blade in the multi-frame blade image as the center point of the blade region in each frame of the blade image, and adjusting the cradle head according to the offset between the center point of the blade region and a center of the corresponding frame of the blade image so that the center point of the blade region moves toward the center of the corresponding frame of the blade image.

In the above-mentioned embodiment, the center of the blade image is a center region centered on the center point of the blade image. When the center point of the blade region is located in the center region, the offset is deemed to be zero.

In the above-mentioned embodiment, when the center point of the blade region is located at an upper side of the blade image, the cradle head is adjusted upward, and when the center point of the blade region is located at a lower side of the blade image, the cradle head is adjusted downward, which is known to those skilled in the art based on common knowledge.

In the above-mentioned embodiment, when detecting the side edges of the blade region, the Houghlines method is used for detection.

According to the above-mentioned embodiment of the present invention, the center point of the blade region is calculated by detecting the side edges of the blade in the blade image, and then the cradle head is adjusted according to the offset between the center point of the blade region and the center of the blade image, realizing the adjustment of the camera shooting angle, so that the center point of the blade region moves toward the center of the corresponding frame blade image in the subsequent frame blade image, making the blade region as close to the center of the blade image as possible, and improving the image quality.

Figure 2:
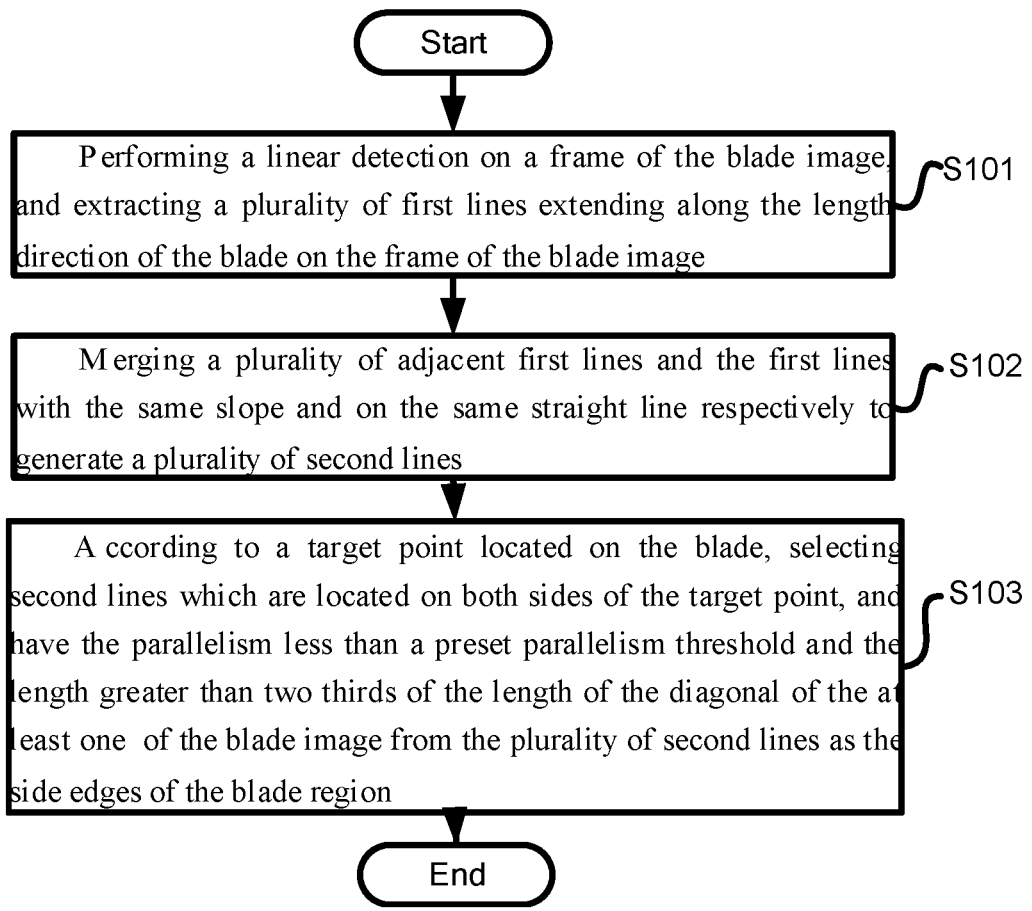
FIG. 2 is a flowchart showing detection for the side edges of the blade region in an embodiment of the present invention.

FIG. 2 is a flowchart for detecting the side edges of the blade region in an embodiment of the present invention. As shown in FIG. 2, the S1 includes the following steps:

S101: performing a line detection on a frame of the blade image, and extracting a plurality of first lines extending along the length direction of the blade on the frame of the blade image;

S102: merging a plurality of adjacent first lines and the first lines with the same slope and on the same straight line respectively to generate a plurality of second lines;

S103: according to a target point located on the blade region, selecting second lines which are located on both sides of the target point, and have the parallelism less than a preset parallelism threshold and the length greater than two thirds of the length of the diagonal of the at least one frame of the blade image from the plurality of second lines as the side edges of the blade region. The parallelism is inversely proportional to the included angle between the two second lines, that is to say, when there is no included angle between the second lines, the parallelism is the highest, and when the angle gradually increases, the parallelism gradually decreases, and the threshold value of the parallelism is the corresponding parallelism when the included angle between the second lines is 10 degrees.

In the embodiment shown in FIG. 2, a plurality of adjacent first lines are merged into a second line, specifically, when the similarity between two first lines is less than another preset similarity threshold, i.e., 3 pixels, the two first lines are considered to be adjacent.

When there is an intersection point between the two first lines, the two first lines are considered to be adjacent. The merging is specifically to compare lengths of the two adjacent first lines and deletes the short line in the two first lines.

The target point can be input manually, that is, the target point can be input by clicking on the blade image. The target point can also be a point automatically selected on the blade region after the blade region is identified.

Figure 3:
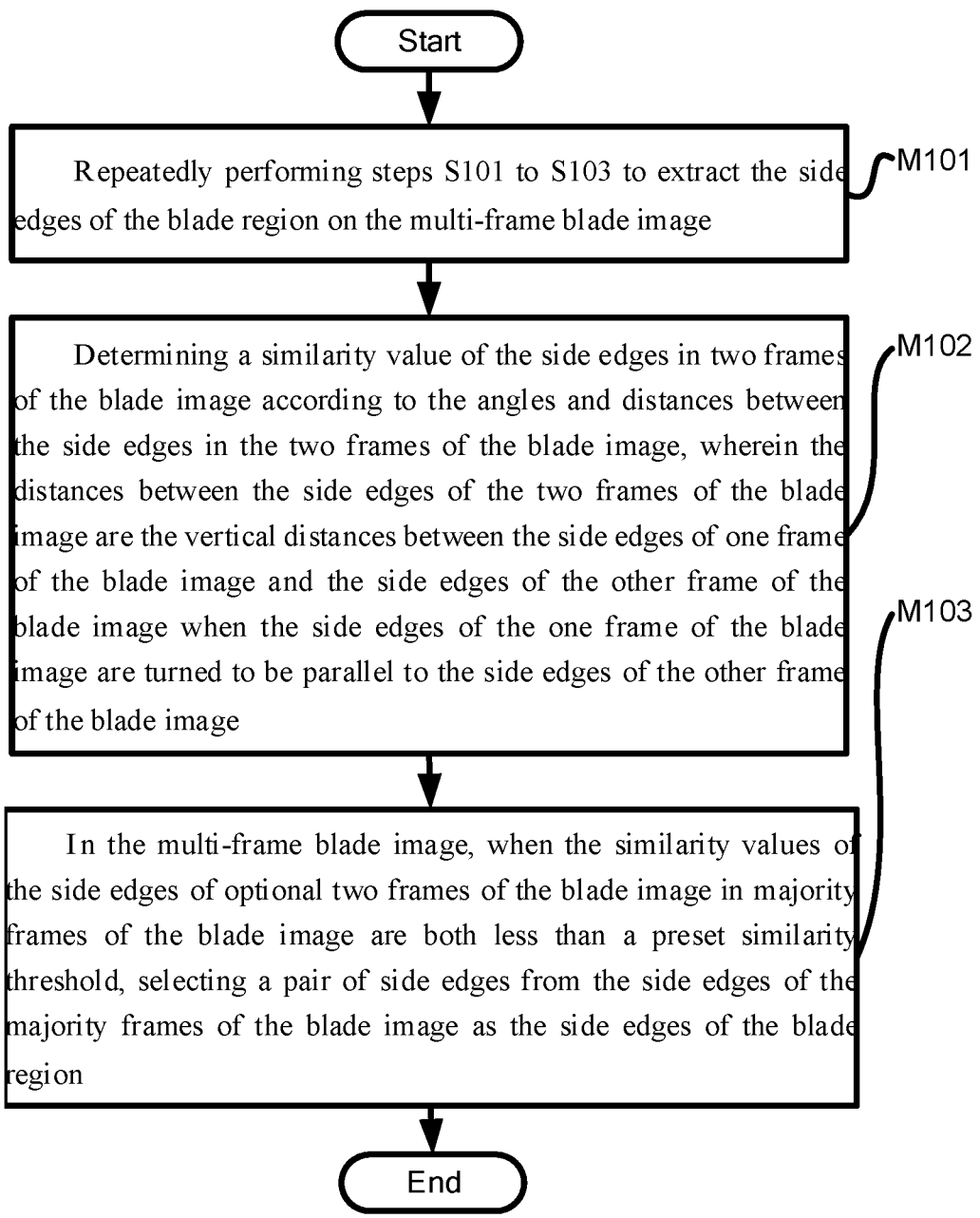
FIG. 3 is a flowchart showing detection for the side edges of the blade region in a modification of the present invention.

FIG. 3 is a flowchart for detecting the side edges of the blade region in a modification of the present invention. As shown in FIG. 3, the method for automatically detecting and tracking the blade, further includes the following steps:

M101: repeatedly performing steps S101 to S103 to extract the side edges of the blade region on the multi-frame blade image;

M102: determining a similarity value of the side edges in two frames of the blade image according to the angles and distances between the side edges in the two frames of the blade image, wherein the distances between the side edges of the two frames of the blade image are the vertical distances between the side edges of one frame of the blade image and the side edges of the other frame of the blade image when the side edges of the one frame of the blade image are turned to be parallel to the side edges of the other frame of the blade image;

M103: in the multi-frame blade image, when the similarity values of the side edges of optional two frames of the blade image in majority frames of the blade image are both less than a preset similarity threshold, selecting a pair of side edges from the side edges of the majority of frames of the blade image as the side edges of the blade region.

In the embodiment shown in FIG. 3, the multi-frame blade image is a five-frame blade image, and the similarity values of the side edges of the two optional frame blade images in the majority frames of the blade image are all less than the preset similarity threshold. Specifically, take the majority of the side edges of the blade region in the five-frame blade image, and similarity values of the side edges of the blade region in at least three frames of the blade image are less than the preset similarity threshold.

Further, in the above-mentioned embodiment, the similarity is specifically as follows. When the side edges of the blade region in a frame of the blade image are represented as $l_1$, $l_2$, and the side edges of the blade region in another frame of the blade image are represented as $l_3$, $l_4$, the similarity value between $l_1$ and $l_3$ is $V(l_1, l_3)$ generated based on the included angle between $l_1$ and $l_3$ and by performing normalization after turning $l_1$ to be parallel to $l_3$. Similarly, $V(l_1, l_4)$, $V(l_2, l_3)$, $V(l_2, l_4)$ can be calculated, the similarity value between the side edges of the blade region in a frame of the blade image and the side edges of the blade region in another frame of the blade image is $V_{total}$. $V_{total}=\min[V(l_1, l_3), V(l_1, l_4)]+\min[V(l_2, l_3), V(l_2, l_4)]$, wherein $V(l_1, l_4)$ is the similarity value between $l_1$ and $l_4$, $V(l_2, l_3)$ is the similarity value between $l_2$ and $l_3$, and $V(l_2, l_4)$ is the similarity value between $l_2$ and $l_4$.

In a specific embodiment, the similarity threshold is 8 pixel values.

Figure 4:
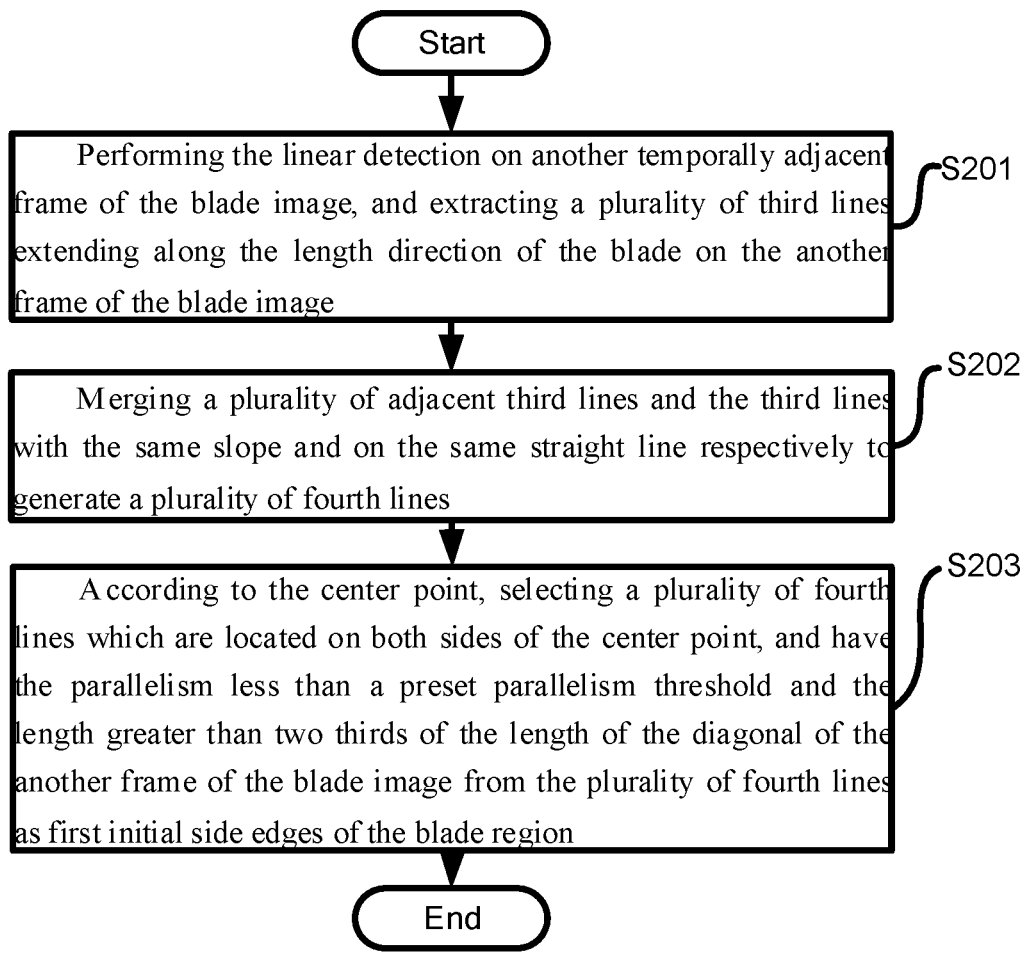
FIG. 4 is a flowchart showing tracking and detection for the side edges of the blade region in an embodiment of the present invention.

FIG. 4 is a flowchart showing steps for tracking and detecting the side edges of the blade region in an embodiment of the present invention. As shown in FIG. 4, the S2 includes the following sub steps:

S201: performing the line detection on another temporally adjacent frame of the blade image, and extracting a plurality of third lines extending along the length direction of the blade on the another frame of the blade image;

S202: merging a plurality of adjacent third lines and the third lines with the same slope and on the same straight line respectively to generate a plurality of fourth lines;

S203: according to the center point, selecting fourth lines which are located on both sides of the center point, and have the parallelism less than a preset parallelism threshold and the length greater than two thirds of the length of the diagonal of the another frame of the blade image as first initial side edges of the blade region.

Figure 5:
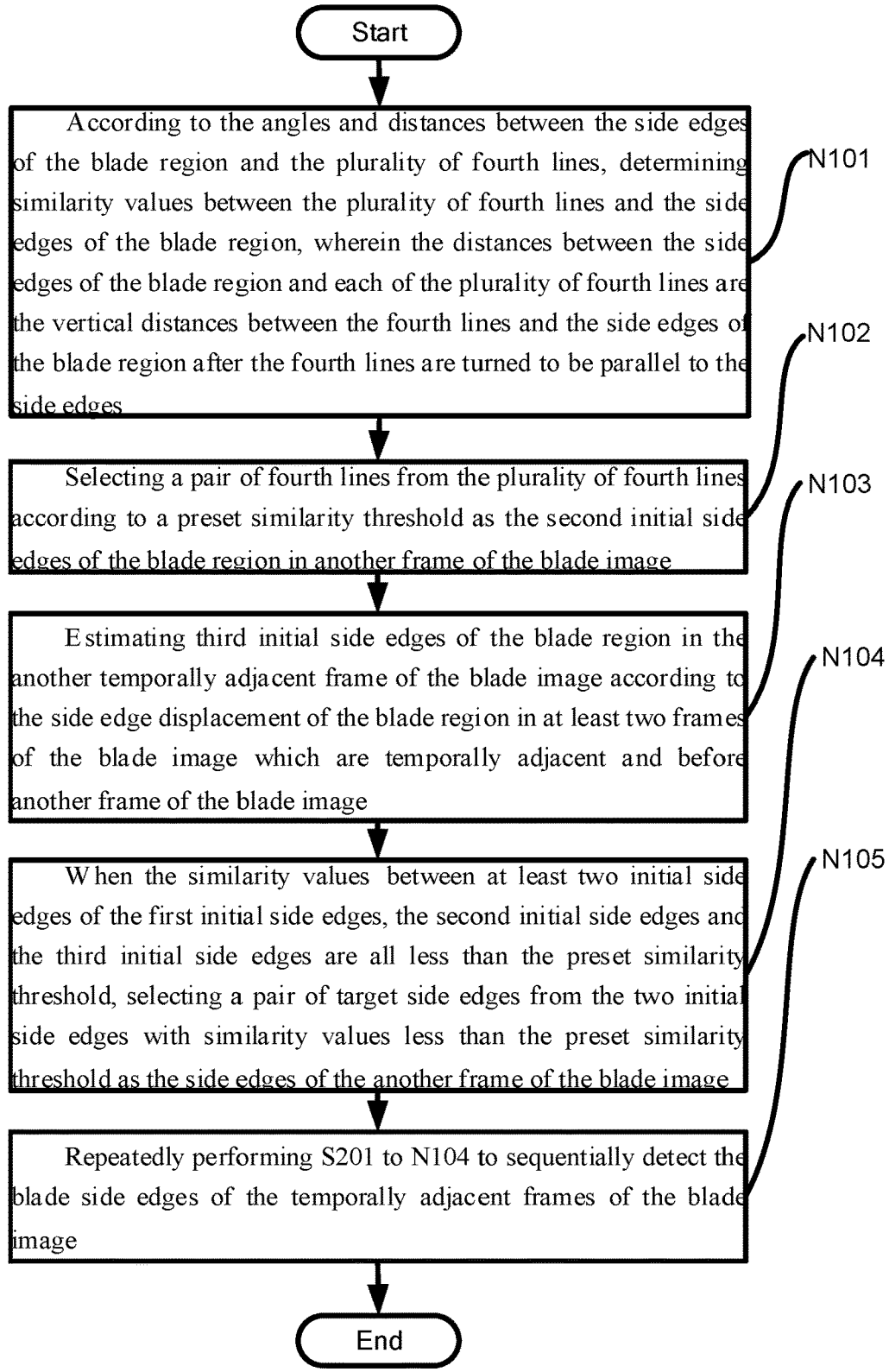
FIG. 5 is a flowchart showing tracking and detection for the side edges of the blade region in a modification of the present invention.
Figure 6:
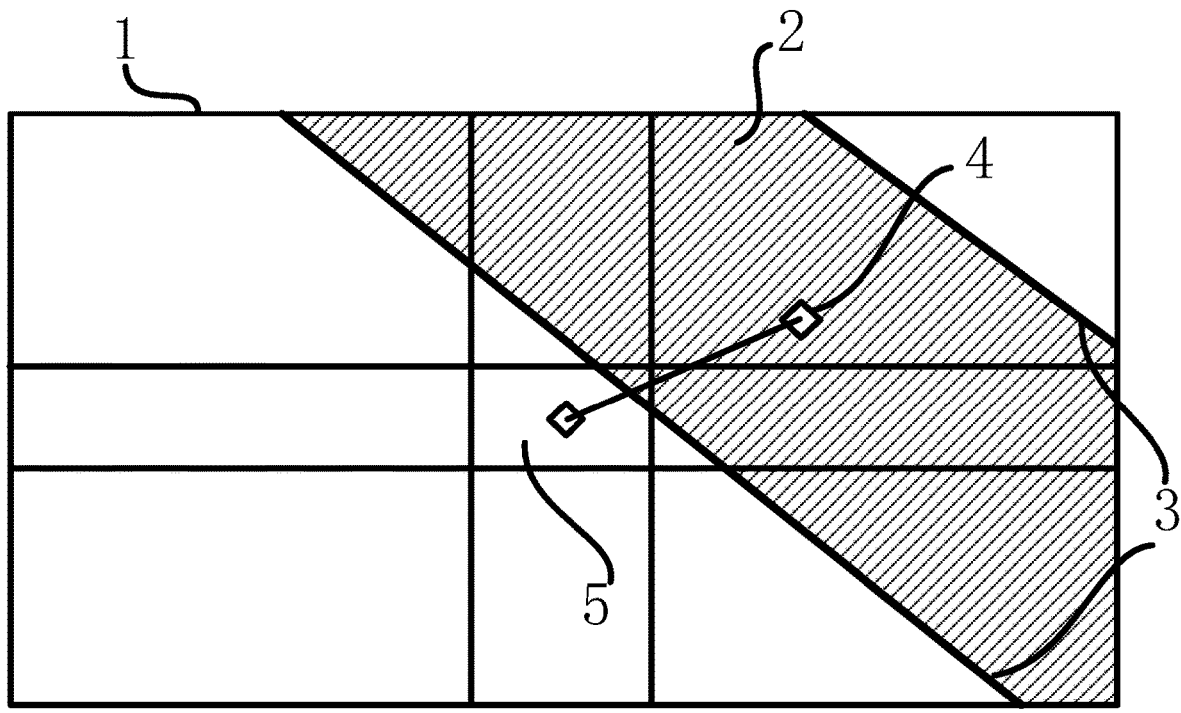
FIGS. 6-8 are schematic diagrams showing the usage of the method for automatically detecting and tracking the blade in an embodiment of the present invention.
Figure 7:
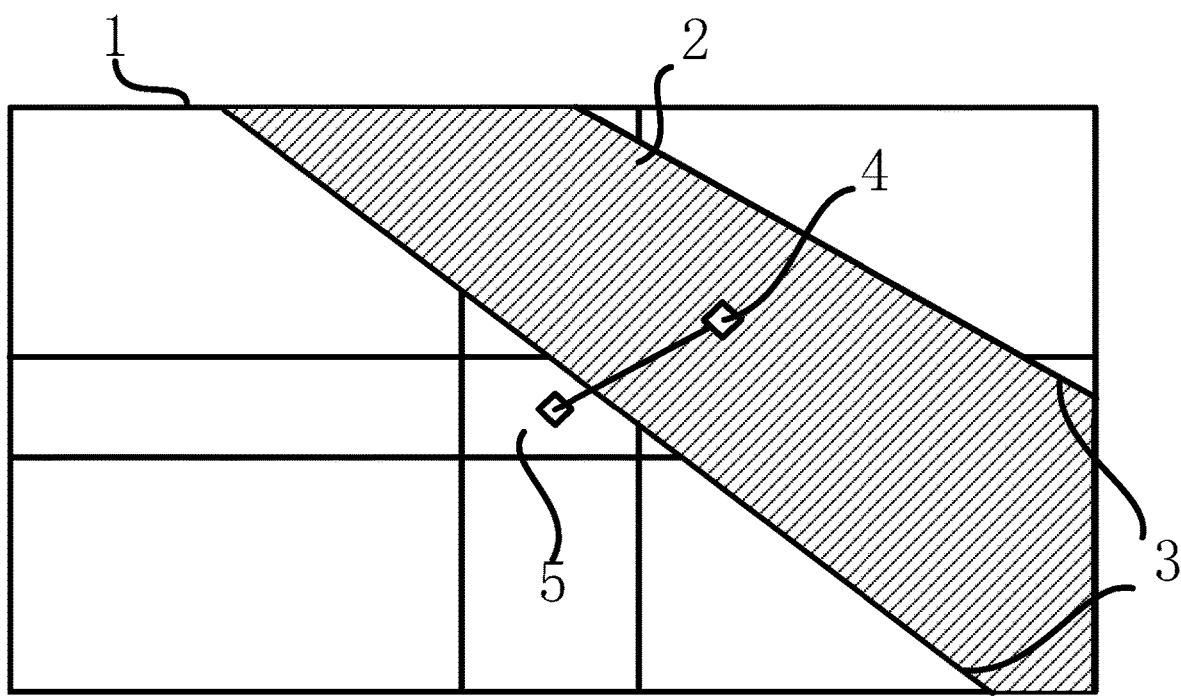
Figure 8:
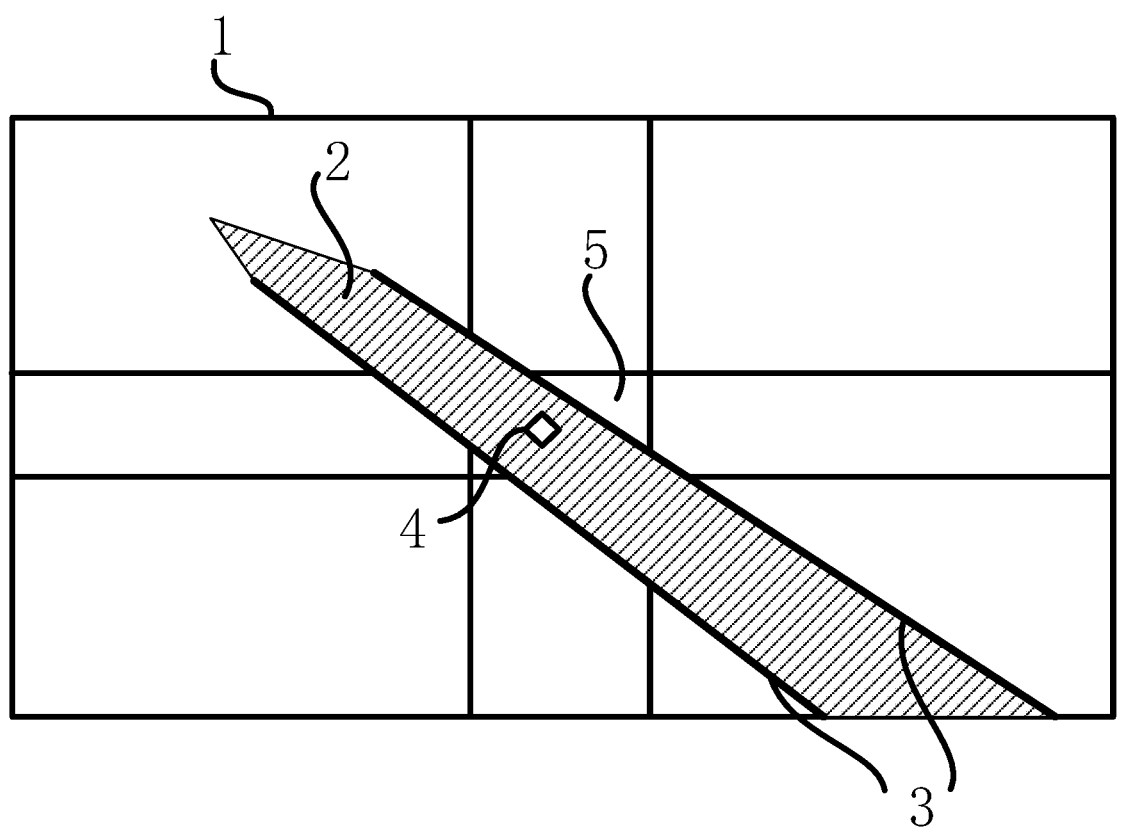

FIG. 5 is a flowchart showing steps for tracing and detecting the side edges of the blade region in an embodiment of the present invention. As shown in FIG. 5, the method for automatically detecting and tracking the blade further includes the following steps:

N101: according to the angles and distances between the side edges of the blade region and the plurality of fourth lines, determining similarity values between the plurality of fourth lines and the side edges of the blade region, wherein the distances between the side edges of the blade region and the plurality of fourth lines are the vertical distances between the fourth lines and the side edges of the blade region after the fourth lines are turned to be parallel to the side edges;

N102: selecting a pair of fourth lines from the plurality of fourth lines according to a preset similarity threshold as the second initial side edges of the blade region in another frame of the blade image;

N103: estimating third initial side edges of the blade region in the another temporally adjacent frame of the blade image according to the side edge displacement of the blade region in at least two frames of the blade image which are temporally adjacent and before another frame of the blade image;

N104: when the similarity values between at least two initial side edges of the first initial side edges, the second initial side edges and the third initial side edges are all less than the preset similarity threshold, selecting a pair of target side edges from the two initial side edges with similarity values less than the preset similarity threshold as the side edges of the another frame of the blade image;

N105: repeatedly performing S201 to N104 to sequentially detect the blade side edges of the temporally adjacent frame of the blade image.

In the embodiment shown in FIG. 5, if the side edges of the blade region are obtained from the first five frames of the blade images, the displacement before the third frame of the blade image and the fourth frame of the blade image multiplied by 0.5 plus the displacement before the fourth frame blade image and the fifth frame blade image multiplied by 0.5 to generate a target displacement to estimate a third initial side edge of the blade region in the sixth frame of the blade image, that is, a third initial side edge of the blade region in another frame blade image.

When the side edge of the blade region in the sixth frame of the blade image is determined, the displacement amount between the sixth frame blade image and the fifth frame blade image is calculated, and a third initial side edge of the blade region in the seventh frame of the blade image is estimated according to the target displacement generated by the displacement before the fourth frame blade image and the fifth frame blade image multiplied by 0.5 plus the displacement before the fifth frame blade image and the sixth frame blade image multiplied by 0.5.

In this embodiment, when the similarity values of any two of the first initial side edges, the second initial side edges, and the third initial side edges are greater than the preset similarity threshold, the similarity values between each corresponding side edges in each initial side edges are sorted, and for each group of corresponding side edges, one group of side edges that coincides with each other is selected as the side edge of another frame of the blade image from the two groups of side edges with the greatest similarity. More specifically, if the first initial side edge is set as $(m_1, m_2)$, the second initial side edge is set as $(m_3, m_4)$, and the third initial side edge is set as $(m_5, m_6)$, when the similarity order is $V(m_1, m_3) < V(m_1, m_5) < V(m_3, m_5) < V, V(m_2, m_4) < V(m_2, m_6) < V(m_4, m_6)$, $m_5, m_6$ are selected as the side edge of another frame of the blade image.

Figure 9:
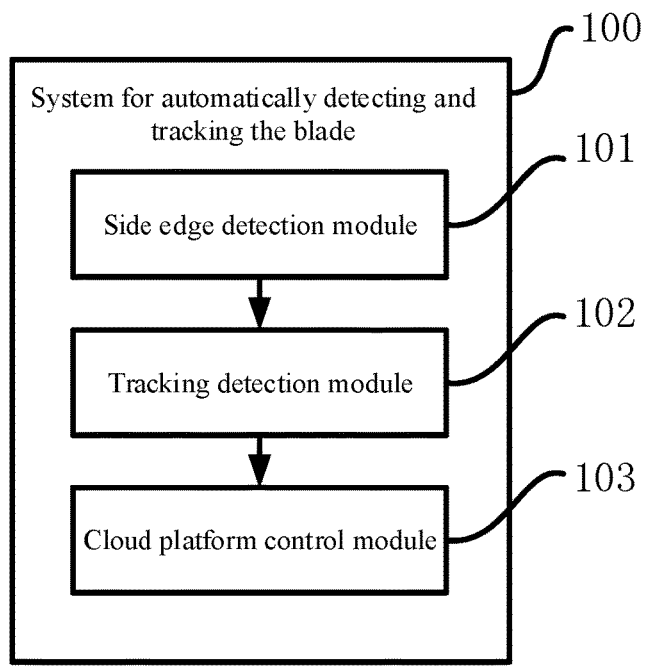
FIG. 9 is a schematic diagram of modules of the system for automatically detecting and tracking the blade in an embodiment of the present invention.

FIG. 9 is the schematic diagram of modules of the system for automatically detecting and tracking the blade in an embodiment of the present invention. As shown in FIG. 9, the embodiment of the present invention also provides a system for automatically detecting and tracking the blade to realize the above-mentioned method for automatically detecting and tracking the blade. The system 100 for automatically detecting and tracking the blade includes the following modules:

side edge detection module 101, configured to detect at least one frame of the blade image in the blade video file and extract the side edges of the blade region in the at least one frame of the blade image;

tracking detection module 102, configured to track and detect the side edges of the blade region in the temporally adjacent multi-frame blade images in the blade video file according to the side edges of the blade region;

cradle head control module 103, configured to determine a midpoint of a connecting line between midpoints of the side edges of the blade in the multi-frame blade image as the center point of the blade region in each frame of the blade image, and adjust the cradle head according to the offset between the center point of the blade region and a center of the corresponding frame of the blade image so that the center point of the blade region moves toward the center of the corresponding frame of the blade image.

The equipment for automatically detecting and tracking the blade provided by another embodiment of the present invention includes a processor and a memory storing executable instructions of the processor. The processor is configured to execute the steps of the method for automatically detecting and tracking the blade by executing the executable instructions.

As above, in the present embodiment, the center point of the blade region is calculated by detecting the side edges of the blade in the blade image, and then the cradle head is adjusted according to the offset between the center point of the blade region and the center of the blade image, realizing the adjustment of the camera shooting angle, so that the center point of the blade region moves toward the center of the corresponding frame blade image in the subsequent frame blade image, making the blade region as close to the center of the blade image as possible, and improving the image quality.

Those skilled in the art will understand that various aspects of the present invention may be implemented as a system, a method, or a program product. Therefore, various aspects of the present invention may be implemented in the following forms: complete hardware implementation, complete software implementation (including firmware and microcode, etc.), or an implementation combining hardware and software aspects, which may be collectively referred to herein as "circuitry," "module," or "platform."

Figure 10:
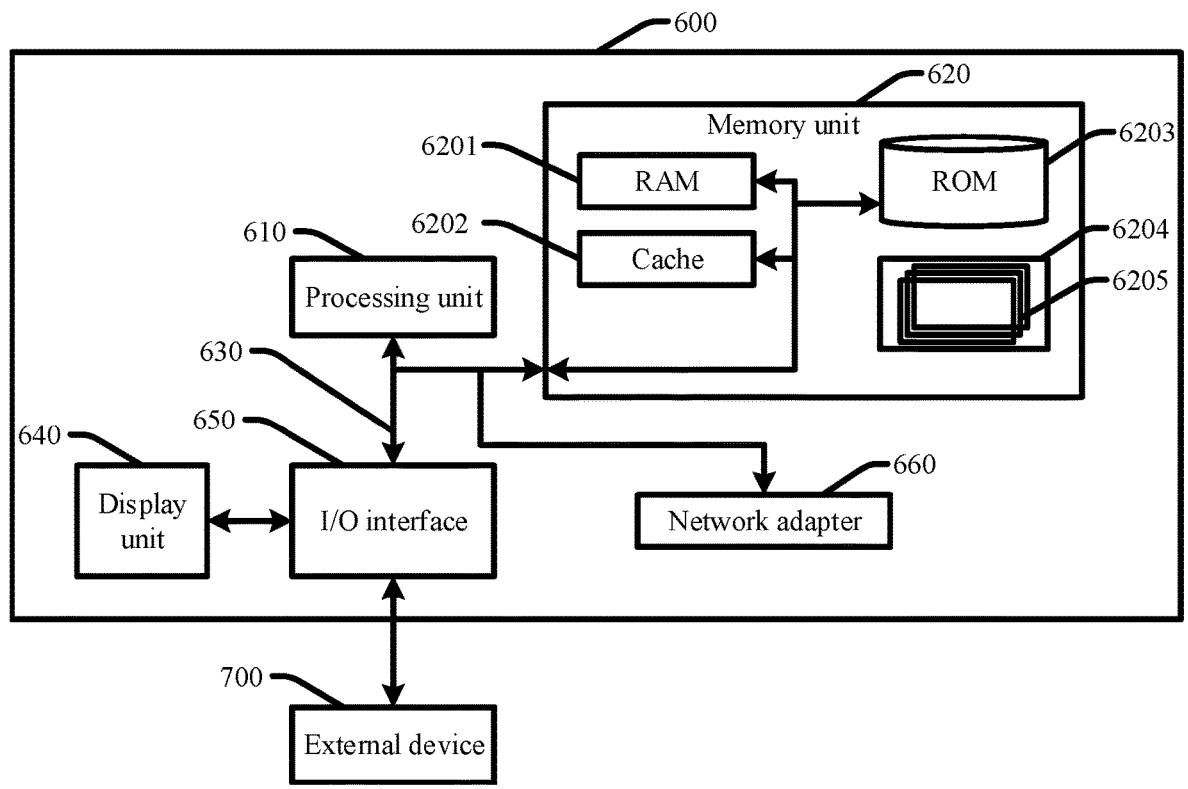
FIG. 10 is a schematic structural diagram of the equipment for automatically detecting and tracking the blade in an embodiment of the present invention.

FIG. 10 is the schematic structural diagram of the equipment for automatically detecting and tracking the blade in an embodiment of the present invention. Electronic device 600 according to this embodiment of the present invention will be described below with reference to FIG. 10. Electronic device 600 shown in FIG. 10 is only an example and should not bring any limitation to the function and use scope of the embodiment of the present invention.

As shown in FIG. 10, electronic device 600 is represented in the form of a general purpose computing device. Components of the electronic device 600 may include, but are not limited to, at least one processing unit 610, at least one memory unit 620, a bus 630 connecting different platform components (including memory unit 620 and processing unit 610) and display unit 640, etc.

The memory unit stores program code which can be executed by processing unit 610, so that processing unit 610 executes the steps according to various exemplary embodiments of the present invention described in the part of the above-mentioned electronic prescription circulation processing method of this specification. For example, processing unit 610 may perform the steps shown in FIG. 1.

Memory unit 620 may include a readable medium in the form of a volatile memory unit, such as random access memory (RAM) unit 6201 and/or cache memory unit 6202, and may further include read-only memory (ROM) unit 6203.

Memory unit 620 may also include program/utility 6204 having a group (at least one) of program modules 6205, such program modules 6205 include, but are not limited to, an operating system, one or more application programs, other program modules, and program data. Implementations of network environments may be included in each or certain combination of these examples.

Bus 630 may be one or more of several types of bus structures including a memory unit bus or memory unit controller, a peripheral bus, a graphics acceleration port, a processing unit, or a local bus using any of various bus structures.

Electronic device 600 may also communicate with one or more external devices 700 (e.g., keyboards, pointing devices, Bluetooth devices, etc.), one or more devices that enable users to interact with electronic device 600, and/ or any device (e.g., routers, modems, etc.) that enables electronic device 600 to communicate with one or more other computing devices. This communication may be performed through input/output (I/O) interface 650. Furthermore, electronic device 600 may also communicate with one or more networks (e.g., local area network (LAN), wide area network (WAN), and/or public networks, e.g., the internet) through network adapter 660. Network adapter 660 may communicate with other modules of electronic device 600 through bus 630. It should be understood that although not shown in FIG. 10, other hardware and/or software modules may be used in conjunction with electronic device 600, including but not limited to microcode, device drivers, redundant processing units, external disk drive arrays, RAID systems, tape drives, and data backup memory platforms, etc.

In other embodiments of the present invention, a computer readable memory medium may also be provided for storing a program and steps of realizing the method for automatically detecting and tracking the blade when the program is executed. In some possible embodiments, various aspects of the present invention may also be implemented in the form of a program product that includes program code for causing the terminal device to perform the steps according to various exemplary embodiments of the present invention described in the part of the above-mentioned electronic prescription circulation processing method of this specification when the program product is running on the terminal device.

As above, when the program of the computer readable memory medium in the embodiment is executed, the center point of the blade region is calculated by detecting the side edges of the blade in the blade image, and then the cradle head is adjusted according to the offset between the center point of the blade region and the center of the blade image, realizing the adjustment of the camera shooting angle, so that the center point of the blade region moves toward the center of the corresponding frame blade image in the subsequent frame blade image, making the blade region as close to the center of the blade image as possible, and improving the image quality.

In the computer readable memory medium of the present invention, program product 800 can adopt a portable compact disc read-only memory (CD-ROM), including program code, and can run on a terminal device, such as a personal computer. However, the program product of the present invention is not limited thereto. In this document, the readable memory medium may be any tangible medium containing or storing a program. The program may be used by or in combination with an instruction execution system, apparatus, or device.

The program product may adapt any combination of one or more readable media. The readable medium may be a readable signal medium or a readable memory medium. For example, the readable memory medium may be but not limited to, an electrical, magnetic, optical, electromagnetic, infrared, or semiconductor system, apparatus, or device, or any combination of the above. More specific examples of readable memory media (a non-exhaustive list) include an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer readable storage medium may include a data signal that propagates in baseband or as part of a carrier wave, carrying readable program code. Such a propagated data signal may take many forms, including but not limited to an electromagnetic signal, an optical signal, or any suitable combination of the above. The readable memory medium may also be any readable medium other than the readable memory medium, the readable medium can send, propagate, or transport a program used by or in connection with the instruction execution system, apparatus, or device. The program code contained on the readable memory medium may be transmitted using any suitable medium, including but not limited to wireless, wired, optical cable, RF, etc., or any suitable combination of the above.

The program code for performing the operations of the present invention may be written in any combination of one or more programming languages, the programming languages include object-oriented programming languages such as Java, C++, etc., as well as conventional procedural programming languages such as the "C" language or similar programming languages. The program code may be completely executed on a user computing device, partially executed on a user device, executed as a stand-alone software package, partially executed on the user computing device and partially on a remote computing device, or completely executed on the remote computing device or server. In the case of a remote computing device, the remote computing device may be connected to the user computing device or an external computing device (e.g., realizing internet connection using an internet service provider) through any kind of network, including a local area network (LAN) or a wide area network (WAN).

According to the present invention, the center point of the blade region is calculated by detecting the side edges of the blade in the blade image, and then the cradle head is adjusted according to the offset between the center point of the blade region and the center of the blade image, realizing the adjustment of the camera shooting angle, so that the center point of the blade region moves toward the center of the corresponding frame blade image in the subsequent frame blade image, making the blade region as close to the center of the blade image as possible, and improving the image quality.

Specific embodiments of the present invention have been described above. It should be understood that the present invention is not limited to the specific embodiments described above, and various modifications or variations can be made by those skilled in the art within the scope of the claims, which does not affect the essence of the present invention.

The invention claimed is:

1. A method for automatically detecting and tracking a blade, configured to track the blade of a wind power generator through an unmanned aerial vehicle, wherein the unmanned aerial vehicle is provided with a cradle head, the cradle head controls a shooting angle of a camera, comprising the following steps:
   S1: acquiring a blade video file through the camera, detecting at least one frame of a blade image in the blade video file, and extracting side edges of a blade region in the at least one frame of the blade image;
   S2: tracking and detecting the side edges of the blade region in temporally adjacent multi-frame blade images in the blade video file according to the side edges of the blade region;
   S3: determining a midpoint of a connecting line between midpoints of the side edges of the blade in the multi-frame blade image as a center point of the blade region in each frame of the blade image, and adjusting the cradle head according to an offset between the center point of the blade region and a center of a corresponding frame of the blade image so that the center point of the blade region moves toward the center of the corresponding frame of the blade image.

2. The method for automatically detecting and tracking the blade according to claim 1, wherein the S1 comprises the following steps:
   S101: performing a line detection on the at least one frame of the blade image, and extracting a plurality of first lines extending along a length direction of a blade on the at least one frame of the blade image;
   S102: merging a plurality of adjacent first lines and first lines with a same slope and on a same straight line respectively to generate a plurality of second lines;
   S103: according to a target point located on the blade region, selecting second lines located on both sides of the target point, having a parallelism less than a preset parallelism threshold and a length greater than two thirds of a length of a diagonal of the at least one frame of the blade image as the side edges of the blade region, and the parallelism is inversely proportional to an included angle between the two of the second lines.

3. The method for automatically detecting and tracking the blade according to claim 2, further comprising the following steps after S103:
   M101: repeatedly performing steps S101 to S103 to extract the side edges of the blade region on multi-frame blade image;
   M102: determining similarity values of the side edges in two frames of the blade image according to angles and distances between the side edges in the two frames of the blade image, wherein the distances between the side edges of the two frames of the blade image are vertical distances between the side edges of a first frame of the blade image and the side edges of the other frame of the blade image when the side edges of the first frame of the blade image are turned to be parallel to the side edges of a second frame of the blade image;
   M103: in the multi-frame blade image, when similarity values of the side edges of optional two frames of the blade image in majority frames of the blade image are both less than a preset similarity threshold, selecting a pair of side edges from the side edges of the majority frames of the blade image as the side edges of the blade region.

4. The method for automatically detecting and tracking the blade according to claim 1, wherein the S2 comprises the following steps:
   S201: performing a line detection on a temporally adjacent frame of the blade image, and extracting a plurality of third lines extending along a length direction of the blade on the temporally adjacent frame of the blade image;
   S202: merging a plurality of adjacent third lines and third lines with a same slope and on a same straight line respectively to generate a plurality of fourth lines;
   S203: according to the center point of the blade region, selecting fourth lines located on both sides of the center point of the blade region, having a parallelism less than a preset parallelism threshold and a length greater than two thirds of a length of a diagonal of the temporally adjacent frame of the blade image as first initial side edges of the blade region.

5. The method for automatically detecting and tracking the blade according to claim 4, after the S203 further comprising the following steps:
   N101: according to angles and distances between the side edges of the blade region and the plurality of fourth lines, determining similarity values between the plurality of fourth lines and the side edges of the blade region, wherein the distances between the side edges of the blade region and the plurality of fourth lines are vertical distances between the fourth lines and the side edges of the blade region after the fourth lines are turned to be parallel to the side edges;
   N102: selecting a pair of fourth lines from the plurality of fourth lines according to a preset similarity threshold as the second initial side edges of the blade region in the temporally adjacent frame of the blade image;
   N103: estimating third initial side edges of the blade region in the temporally adjacent frame of the blade image of adjacent time according to the side edge displacement of the blade region in at least two frames of the blade image, wherein the two frames of the blade image are temporally adjacent and before the temporally adjacent frame of the blade image;

N104: when similarity values between at least two initial side edges of the first initial side edges, the second initial side edges and the third initial side edges are all less than the preset similarity threshold, selecting a pair of target side edges from the two initial side edges with similarity values less than the preset similarity threshold as the side edges of the temporally adjacent frame of the blade image;

N105: repeatedly performing S201 to N104 to sequentially detect the side edges of the blade of temporally adjacent frames of the blade image.

6. The method for automatically detecting and tracking the blade according to claim 1, wherein a center of the blade image is a center region centered on the center point of the blade image; when the center point of the blade region is located in the center region, the offset is deemed to be zero.

7. The method for automatically detecting and tracking the blade according to claim 2, wherein a similarity value is specifically that when the side edges of the blade region in a first frame of the blade image are represented as $l_1$, $l_2$, and the side edges of the blade region in a second frame of the blade image are represented as $l_3$, $l_4$, a similarity value between $l_1$ and $l_3$ is $V(l_1, l_3)$ generated based on an included angle between $l_1$ and $l_3$ and by performing normalization after turning $l_1$ to be parallel to $l_3$, the side edges of the blade region in the first frame of the blade image and the side edges of the blade region in the second frame of the blade image is $V_{total}$. $V_{total}=\min[V(l_1, l_3), V(l_1, l_4)]+\min[V(l_2, l_3), V(l_2, l_4)]$, $V(l_1, l_4)$ is a similarity value between $l_1$ and $l_4$, $V(l_2, l_3)$ is a similarity value between $l_2$ and $l_3$, and $V(l_2, l_4)$ is a similarity value between $l_2$ and $l_4$.

8. A system for automatically detecting and tracking the blade configured to realize the method for automatically detecting and tracking blade according to claim 1, comprising:
  a side edge detection module, configured to detect the at least one frame of the blade image in the blade video file and extract the side edges of the blade region in the at least one frame of the blade image;
  a tracking detection module, configured to track and detect the side edges of the blade region in the temporally adjacent multi-frame blade images in the blade video file according to the side edges of the blade region;
  a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

9. A equipment for automatically detecting and tracking the blade, comprising:
  a processor, and a memory storing executable instructions of the processor; wherein the processor is configured to execute the steps of the method for automatically detecting and tracking the blade according to claim 1 by executing the executable instructions.

10. The method for automatically detecting and tracking the blade according to claim 4, wherein a similarity value is specifically that when the side edges of the blade region in a first frame of the blade image are represented as $l_1$, $l_2$, and the side edges of the blade region in a second frame of the blade image are represented as $l_3$, $l_4$, a similarity value between $l_1$ and $l_3$ is $V(l_1, l_3)$ generated based on an included angle between $l_1$ and $l_3$ and by performing normalization after turning $l_1$ to be parallel to $l_3$, the side edges of the blade region in the first frame of the blade image and the side edges of the blade region in the second frame of the blade image is $V_{total}$. $V_{total}=\min[V(l_1, l_3), V(l_1, l_4)]+\min[V(l_2, l_3), V(l_2, l_4)]$, $V(l_1, l_4)$ is a similarity value between $l_1$ and $l_4$, $V(l_2, l_3)$ is a similarity value between $l_2$, and $l_3$, and $V(l_2, l_4)$ is a similarity value between $l_2$ and $l_4$.

11. A system for automatically detecting and tracking the blade configured to realize the method for automatically detecting and tracking blade according to claim 2, comprising:
  a side edge detection module, configured to detect the at least one frame of the blade image in the blade video file and extract the side edges of the blade region in the at least one frame of the blade image;
  a tracking detection module, configured to track and detect the side edges of the blade region in the temporally adjacent multi-frame blade images in the blade video file according to the side edges of the blade region;
  a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

12. A system for automatically detecting and tracking the blade configured to realize the method for automatically detecting and tracking blade according to claim 3, comprising:
  a side edge detection module, configured to detect the at least one frame of the blade image in the blade video file and extract the side edges of the blade region in the at least one frame of the blade image;
  a tracking detection module, configured to track and detect the side edges of the blade region in the temporally adjacent multi-frame blade images in the blade video file according to the side edges of the blade region;
  a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

13. A system for automatically detecting and tracking the blade configured to realize the method for automatically detecting and tracking blade according to claim 4, comprising:
  a side edge detection module, configured to detect the at least one frame of the blade image in the blade video file and extract the side edges of the blade region in the at least one frame of the blade image;

a tracking detection module, configured to track and detect the side edges of the blade region in the temporally adjacent multi-frame blade images in the blade video file according to the side edges of the blade region;

a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

14. A system for automatically detecting and tracking the blade configured to realize the method for automatically detecting and tracking blade according to claim 5, comprising:

a side edge detection module, configured to detect the at least one frame of the blade image in the blade video file and extract the side edges of the blade region in the at least one frame of the blade image;

a tracking detection module, configured to track and detect the side edges of the blade region in the temporally adjacent multi-frame blade images in the blade video file according to the side edges of the blade region;

a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

15. A system for automatically detecting and tracking the blade configured to realize the method for automatically detecting and tracking blade according to claim 6, comprising:

a side edge detection module, configured to detect the at least one frame of the blade image in the blade video file and extract the side edges of the blade region in the at least one frame of the blade image;

a tracking detection module, configured to track and detect the side edges of the blade region in the temporally adjacent multi-frame blade images in the blade video file according to the side edges of the blade region;

a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

16. A system for automatically detecting and tracking the blade configured to realize the method for automatically detecting and tracking blade according to claim 7, comprising:

a side edge detection module, configured to detect the at least one frame of the blade image in the blade video file and extract the side edges of the blade region in the at least one frame of the blade image;

a tracking detection module, configured to track and detect the side edges of the blade region in the temporally adjacent multi-frame blade images in the blade video file according to the side edges of the blade region;

a cradle head control module, configured to determine the midpoint of the connecting line between the midpoints of the side edges of the blade in the multi-frame blade image as the center point of the blade region in each of the frames of the blade image, and adjust the cradle head according to the offset between the center point of the blade region and the center of the corresponding frame of the blade image so that the center point of the blade region moves toward the center of the corresponding frame of the blade image.

17. A equipment for automatically detecting and tracking the blade, comprising:

a processor, and a memory storing executable instructions of the processor; wherein the processor is configured to execute the steps of the method for automatically detecting and tracking the blade according to claim 2 by executing the executable instructions.

18. A equipment for automatically detecting and tracking the blade, comprising:

a processor, and a memory storing executable instructions of the processor; wherein the processor is configured to execute the steps of the method for automatically detecting and tracking the blade according to claim 3 by executing the executable instructions.

19. A equipment for automatically detecting and tracking the blade, comprising:

a processor, and a memory storing executable instructions of the processor; wherein the processor is configured to execute the steps of the method for automatically detecting and tracking the blade according to claim 4 by executing the executable instructions.

20. A equipment for automatically detecting and tracking the blade, comprising:

a processor, and a memory storing executable instructions of the processor; wherein the processor is configured to execute the steps of the method for automatically detecting and tracking the blade according to claim 4 by executing the executable instructions.

* * * * *